United States Patent Office 3,123,756
Patented Mar. 3, 1964

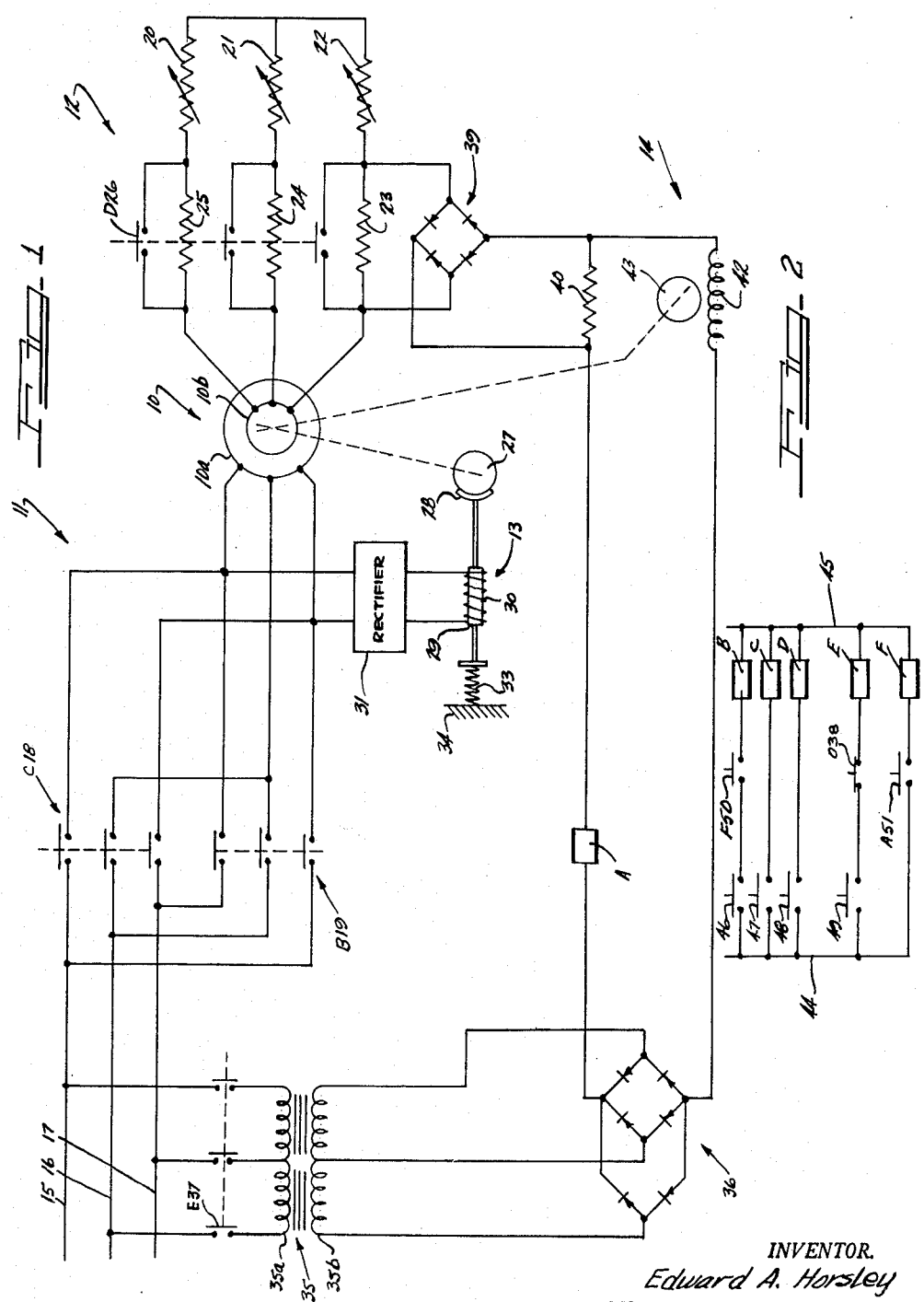

3,123,756
HOIST MOTOR CONTROL WITH EDDY CURRENT BRAKING SYSTEM
Edward Alexander Horsley, Niagara Falls, Ontario, Canada, assignor to Provincial Engineering Ltd., Niagara Falls, Ontario, Canada, a corporation of Canada
Filed May 3, 1961, Ser. No. 107,373
7 Claims. (Cl. 318—209)

This invention relates to control systems for wound rotor induction motors and, more particularly, to a control system that has an artificial load, such as an eddy current brake, coupled to the induction motor and means to vary the braking force applied to the artificial load.

Polyphase induction motors are usually employed to handle crane hoisting operations. Quite often, a variable resistance circuit is connected in the rotor winding circuit of the motor in order to vary the speed and the torque output of the hoist motor, and artificial loads have been coupled to the induction motor to provide a braking force when a load is being lowered. An artificial load commonly used is an eddy current brake which has a rotary member coupled to the rotor of the induction motor and an exciting winding connected to an electric potential source.

An eddy current brake excited by a constant voltage selected to provide adequate torque for the safe lowering of overloads produces so much torque when light loads are being lowered that considerable motor torque must be provided to give an adequate lowering speed for the light loads. This large motor torque results is unnecessary heating of both the motor and brake. On the other hand, the use of increased brake excitation to provide the additional brake torque required for the safe lowering of an overload and the automatic reduction of this excitation when light loads are being lowered permits the slow lowering of the heavy loads and permits the desired speeds of light loads to be obtained with a reduced value of motor torque. The variable excitation permits the use of a smaller brake in some instances.

Various methods have been used to produce the desired variations of the eddy current brake excitation but up to now all have attempted to relate the speed of the motor to the excitation of the eddy current brake. Devices commonly used to perform this function are self-saturating magnetic amplifiers and saturable reactor type magnetic amplifiers. Each of these devices have definite limitations in their application to crane hoist work. The self-saturating magnetic amplifier is complicated to control and very costly. The saturable reactor magnetic amplifier is less costly but introduces a rather serious time delay in the response to a control signal change which results in an overshoot or undershoot from the desired speed change. Furthermore, while the saturable reactor amplifier is less costly than the self-saturating magnetic amplifier it is still an expensive piece of equipment, particularly if it is sized to produce the most desirable degree of motor unloading.

Accordingly, it is an object of this invention to obviate these difficulties by providing a novel and improved eddy current braking system which is relatively inexpensive as compared with prior art control systems and which is simple in construction and dependable in operation.

It is still another object of this invention to provide an eddy current braking system which has a negligible time constant and which, because of the low cost of components, can be made so effective that unnecessary brake and motor heating is reduced to a very low level.

It is still another object of this invention to control the excitation of the eddy current brake in inverse proportion to the load reflected on the motor by the eddy current brake regardless of the speed at which the motor may be running.

Other objects, features and advantages of the present invention will be apparent from the following detailed description taken in conjunction with the accompanying figures of the drawing in which:

FIGURE 1 is a schematic diagram of an eddy current braking system for a wound rotor induction motor drive constructed in accordance with the invention; and FIGURE 2 is a schematic diagram of a portion of a control circuit for the system illustrated in FIGURE 1.

With reference to FIGURE 1, there is illustrated a wound rotor induction motor 10 that has its primary winding 10a connected to a power supply circuit 11 and its rotor winding 10b connected to a variable resistance accelerating circuit 12. A conventional magnetically controlled friction brake 13 is mechanically coupled to the rotor of the motor 10, and an eddy current braking circuit is electrically coupled to the power supply circuit 11 and the network 12 and mechanically coupled to the rotor of the motor 10.

The power supply circuit 11 includes three conductors, 15, 16 and 17 which are connected in operation to a suitable polyphase alternating current source and two sets of relay contacts C18 and B19. The connection of the conductors 15, 16 and 17 to the primary winding 10a is such that when the contacts C18 are closed the motor 10 is driven in a first direction and when the contacts B19 are closed the motor is driven in the opposite direction.

The magnetic brake 13 is a conventional D.-C. type that is connected to apply a braking force only when it is not energized by an electric current. This brake includes a brake drum 27 and a brake shoe 28 that is mechanically coupled to the plunger 29 of a solenoid. The operating winding 30 for this solenoid is connected through a rectifier 31 across two of the conductors 15—17. A compression spring 33 is positioned between a stationary barrier 34 and an extension of the plunger 29 and normally urges the shoe 28 against the drum 27. The shoe is pulled away from the drum and the braking force withdrawn only when the winding 30 is energized.

The accelerating circuit 12 for the rotor winding 10b includes three variable resistors, 20, 21 and 22 and two fixed resistors 24 and 25; the circuit 12 also includes the resistance presented by the network of resistor 23, rectifier 39 and resistor 40; the values of these components are selected and proportioned to give balanced WYE operation in the rotor circuit. The ohmic relationship of the resistor 23 to that of the resistor 40 is such that practically all of the rotor current in this phase is converted to direct current by the rectifier 39 and passes through the resistor 40. The resistor 23 is used as a trimming unit and may in fact be eliminated on some drives.

The eddy current braking circuit 14 includes a three phase transformer 35 that has its primary winding 35a connected across the conductors 15–17 and its secondary 35b connected across a rectifier 36. The output of the rectifier 36 is connected across the resistor 40 in series with the coil A of a relay and the exciting winding 42 of an eddy current brake. The rotating member 43 of the eddy current brake is mechanically coupled to the rotor of the motor 10.

An examination of the eddy current braking circuit and the interconnected accelerating circuit will reveal that the maximum excitation of the eddy current brake winding 42 is determined by the voltage drop across transformer 35 and the ohmic value of the circuit which includes coil A the resistor 40 and the winding 42. This maximum excitation value is selected so that with no rotor current flowing the eddy current brake will exert approximately 150% motor torque at synchronous speed. Since the motor does in fact produce no rotor current or torque at synchronous speed, the above noted 150% motor torque will always be the brake torque at motor synchronous speed. Any load that would require this value of torque to restrain it while being lowered is well in excess of 200% rated hook load; therefore, the overload ability of the system is well demonstrated.

With normal or light loads on the crane hook and with the eddy current brake winding excited the motor will operate in the sub-synchronous range and will exert torque in the downward direction and thereby work in opposition to the eddy current brake.

Since any work done by the motor at this time must be absorbed by the eddy current brake it is desirable to use motor rotor current to reduce eddy current brake excitation and thereby reduce unnecessary heating. This is accomplished in the following manner. Since motor torque is proportional to rotor current, any current flowing from the rotor 10b through the rectifier 39 and the resistor 40 will produce a voltage drop across the resistor 40 which is in direct proportion to the torque of the motor 10. The rectifier 39 is so connected that the polarity of its voltage drop across the resistor 40 is in opposition to and subtractive from the voltage produced by the transformer 35 and the rectifier 36. This then will bring about a reduction of the excitation current flowing from the rectifier 36 through the coil A, the resistor 40 and the eddy current brake winding 42. Since the eddy current brake is mechanically coupled to retard the hoist motor, any reduction in its excitation current and consequent reduction in its torque will result in a reduced level of motor torque. The motor torque and brake torque will then balance out at a considerably reduced value from that which would be obtained with a constant potential excitation of the eddy current brake.

In the practical application of this circuit the desired speed range is selected by adjustment of the variable resistors, 20, 21 and 22 and the obtained speed is a function of the eddy current brake torque in opposition to the sum of the motor torque and the torque reflected from the load being lowered. If no load is being lowered then the motor torque is equal to and opposite to the brake torque. With no load on the hook the rotor current is at maximum for any given adjustment of variable resistors 20, 21 and 22. But since this maximum rotor current produces the greatest reduction of eddy current brake excitation the level of useless work and heat produced is greatly reduced. If at the same fixed setting of the variable resistors 20, 21 and 22 a substantial load were to be lowered the hoist motor would tend to increase in speed since the eddy current brake must resist the sum of the motor torque and reflected load torque.

The increase in rotor speed results in a lower voltage being produced by the motor rotor 10b and a consequent drop in rotor current in the circuit 12 and a proportional decrease in voltage produced by the rectified rotor current passing through the resistor 40. As described earlier the voltage drop across the resistor 40 is in opposition to and subtractive from the voltage produced by the transformer 35 and the rectifier 36. Therefore, the reduction in the voltage produced by the new lower rotor current results in a new and higher level of eddy current brake excitation. It can be seen then that the circuit is automatic and completely self-corrective since with a light load or empty hook condition, minimum brake excitation is supplied and with moderate or heavy loads, increased value of brake excitation is supplied.

For any given setting of the variable resistors 20, 21 and 22 it is obvious that the described system will greatly reduce changes in speed resulting in changes in hook load as opposed to that obtainable from any system using constant potential excitation of the eddy current brake. And this is accomplished with no sacrifice of safety since the maximum excitation of the eddy current brake is always available as described earlier.

If a sudden acceleration of the hoist motor is required by quick reduction of the ohmic value of the adjustable resistors 20, 21 and 22 the increased voltage drop caused by the motor accelerating current passing through the resistor 40 will cause an instantaneous drop in the voltage available to drive current through the eddy current brake winding 42 and substantially reduce the unwanted drag of the braking unit at the time. However, as the motor speeds up and the accelerating current diminishes, the circuit will again establish the required level of brake excitation at the new higher speed.

If a substantial load is being lowered at high speed and a sudden deceleration is demanded by a quick increase of the ohmic value of the adjustable resistors 20, 21 and 22, the circuit automatically increases eddy current brake excitation to provide rapid and smooth deceleration without danger of instability occurring in the eddy current brake due to armature reaction. If the motor is operating at or near synchronous speed the voltage produced in the rotor winding is very small and any substantial increase in rotor resistance will bring about a drastic decrease in rotor current. The new lower rotor current and consequent instantaneous reduction of proportional voltage drop caused by rotor current in the resistor 40 immediately makes a high proportion of the voltage output of the rectifier 36 available to force current through the coil A, the resistor 40 and the eddy current brake winding 42. This instantaneous response causes an immediate increase in brake excitation exactly when it is most required and prevents instability and/or a speed increase before a speed decrease. As speed is reduced by the high level of brake torque the voltage of rotor 10 increases and causes more current to flow in the rotor circuit 12. This brings about a gradual decrease in brake excitation until the required level of torque is produced to maintain speed at the new desired level.

The demonstrated circuit uses a full wave rectifier 39 and a power resistor 40 in a simple arrangement in place of self-saturating magnetic amplifiers and/or saturable core reactor magnetic amplifiers which are difficult and complicated to control and relatively costly. An interesting feature is that this system of reducing unnecessary brake and motor torque is so effective that steady state rotor currents rarely exceed 50% rated rotor current when a load is being lowered. This is, of course, taken into consideration in selecting the thermal rating of the resistors 25 and 24, the rectifier 39 and the resistor 40. An even greater reduction in comparative cost is realized because of the reduced thermal capacity required in these units.

The operating windings for the relay contacts C18, B19, D26 and E37 may be energized by manually connecting them to a source of electric potential or a conventional control circuit can be provided for this purpose. One such control circuit is illustrated in FIGURE 2. It should be understood that this circuit may be modified by those skilled in the art to include means to vary the resistors 20, 21 and 22, control safety circuits, timing or accelerator circuits, etc.

With reference to FIGURE 2, the control circuit includes two lines 44 and 45 which are connected to a suitable source of electric potential, four push button switches 46, 47, 48 and 49, three relay contacts D38, F50 and A51, and five relay coils B, C, D, E and F. The letters that form part of the reference characters for the relay contacts indicate their associated coils.

To cause the motor 10 to exert a hoisting torque the switch 47 is closed which picks up the coil C and closes the contacts C18. To lower a load the switch 49 is closed first which picks up the coil E and closes the contacts E37, FIGURE 1. Current flows through the coil A and closes the contacts A51, FIGURE 2, which picks up the coil F. Then with the contacts F50 closed the switch 46 can be closed and the coil B energized. The contacts B19 then close which release the brake 13 and applies power to the motor 10. If the eddy current braking circuit 14 is to be entirely disconnected, the switch 48 may be closed and the coil D energized. This action opens the contacts D38, drops out the relay E, disconnects the transformer 35 and closes and contacts D26 which shorts out the rectifier 39.

The circuits illustrated in FIGURES 1 and 2 may be modified by those skilled in the art to include conventional lockout circuits, fuses, overload relays, master switches, etc. Of course, instead of the push button switches 46–49 the usual cam operated master control can be used.

The coil A, FIGURE 1, ensures that exciting current is applied to the eddy current brake before a lowering torque is permitted and the magnetic brake 13 is released. It is constructed to be energized through the entire range of currents delivered to the exciting winding 42.

The coil E is preferably kept energized a short time after the contacts B19 are opened when the load is being lowered so that the eddy current brake will assist the magnetic brake in bringing the load to a stop. This may be done manually or by a timing mechanism in the circuit.

It is apparent that a novel and useful eddy current braking system for an induction motor drive of the type used on cranes has been provided. In accordance with this invention a high power rating resistor is used to control the current flow through an eddy current brake and does away with the necessity of using a magnetic amplifier which is far more expensive. This is a great advantage since it cuts down on heat dissipation and increases the operating efficiency. In addition, this novel and useful control system responds very rapidly to changes in demand while magnetic amplifier controlled systems have a considerable time delay.

It will be apparent that modifications and variations may be effected without departing from the scope of the novel concepts of the present invention.

The embodiments of the invention in which an exclusive property or privilege is claimed are defined as follows:

1. A braking system for a wound rotor motor that has a primary winding and a rotor winding, comprising a brake adapted to be coupled to the motor that has its exciting member electrically connected in a loop that also includes a resistive impedance, means for producing a relatively constant voltage which causes a current to flow around said loop, and regulating circuit means in series with one phase of the rotor circuit for causing a voltage to appear across said resistive impedance that is proportional to the load on the motor, the polarity of said voltage drop being such that it opposes said relatively constant voltage and reduces the resulting current flow around said loop.

2. An eddy current braking system for a motor that has a primary winding and a rotor winding, comprising an eddy current brake that has its exciting winding electrically connected in a loop that also includes a resistive impedance, regulating circuit means in series with one phase of the rotor circuit for producing a relatively constant voltage which causes a current to flow around said loop, and means for causing a voltage to appear across said resistive impedance that is proportional to the load on the motor, the polarity of said voltage drop being such that it opposes said relatively constant voltage and reduces the resulting current flow around said loop.

3. A braking system for a wound rotor induction motor that has a primary winding and rotor winding, comprising an eddy current brake that has its exciting winding electrically connected in a loop that includes a resistive impedance, means for impressing relatively constant voltage on said loop, said resistive impedance being electrically coupled to the rotor winding in series with one phase so that a voltage appears across said resistive impedance that is proportional to the current flowing through the rotor winding, the polarity of said voltage drop across said resistive impedance being such that it is in opposition to said relatively constant voltage and thereby reduces the resultant loop current.

4. An eddy current braking system for a wound rotor induction motor that has a primary winding and a rotor winding, comprising an eddy current brake that has its exciting winding connected in a loop that includes a resistive impedance, means electrically coupling said loop to said primary winding in such a manner that a relatively constant voltage is impressed on said loop, said resistive impedance being electrically coupled to the rotor winding in series with one phase so that a voltage drop appears across said resistive impedance which is proportional to the magnitude of the current flowing through the rotor winding, the polarity of said voltage drop being such that it opposes said relatively constant voltage and reduces the resultant loop current, first switch means which is adapted to uncouple said loop from the primary winding of the motor and second switch means which is adapted to uncouple said loop from the rotor winding of the motor, a control circuit having means to operate said first and second switch means, said control circuit also being adapted to control the application of electrical power to the motor in first and second directions, and electrical means coupled to said loop and said control circuit which is adapted to prevent power from being applied in said first direction by said control circuit to the motor when said exciting winding is not energized.

5. In an electrical braking system for a motor having a three-phase stator and rotor, the improvement of
 a regulating circuit in series with one phase of the rotor circuit in which a voltage appears which is proportional to the load on the motor at any normal operating speed of the motor,
 rectifying means in said regulating circuit to convert a major portion of the rotor current to direct current, an excitation circuit for a braking means,
 and a fixed resistance means in said regulating circuit and in said excitation circuit,
 whereby the voltage appearing across said fixed resistor means resulting from rotor current opposes the excitation voltage in said excitation circuit to correspondingly reduce braking torque exerted on the motor.

6. An electrical braking system wherein braking torque varies as a function of excitation current, comprising,
 a wound rotor motor of the type wherein the current in the rotor circuit of the motor is proportional to torque load on the motor through its normal range of operating speeds.
 an accelerating circuit for the motor including variable rotor resistance means,
 a regulating circuit in series with one phase of the rotor circuit in which a voltage appears which is proportional to the load on the motor at any normal operating speed of the motor,
 rectifying means in said regulating circuit to convert a major portion of the rotor current to direct current,
 an excitation circuit for a braking means,
 and a fixed resistance means in said regulating circuit and in said excitation circuit, whereby the voltage appearing across said fixed resistance means resulting from rotor current opposes the excitation voltage in said excitation circuit to correspondingly reduce braking torque exerted on the motor.

7. In a braking system as defined in claim 5, said regulating circuit having a trimming resistor in parallel with said rectifying means and having an ohmic relation to said fixed resistance means selected to predetermine the proportion of rotor current in said one phase which is converted to direct current.

References Cited in the file of this patent

UNITED STATES PATENTS

| | | |
|---|---|---|
| 2,581,292 | Rathbun | Jan. 1, 1952 |
| 2,963,634 | Cortelli et al. | Dec. 6, 1960 |